(12) United States Patent
Porte et al.

(10) Patent No.: US 11,649,063 B2
(45) Date of Patent: May 16, 2023

(54) ACOUSTIC PANEL FOR AN AIRCRAFT NACELLE AIR INLET WITH CASTELLATED RESISTIVE SKIN, PROPULSION UNIT AND AIRCRAFT FITTED WITH SUCH ACOUSTIC PANELS

(71) Applicant: Airbus Operations SAS, Toulouse (FR)

(72) Inventors: Alain Porte, Toulouse (FR); Jacques Lalane, Toulouse (FR); Benoit Przybyla, Toulouse (FR); Thierry Colcombet, Chaponost (FR); Franck Colcombet, Chaponost (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 145 days.

(21) Appl. No.: 17/017,429

(22) Filed: Sep. 10, 2020

(65) Prior Publication Data
US 2021/0078717 A1    Mar. 18, 2021

(30) Foreign Application Priority Data
Sep. 12, 2019 (FR) ...................................... 1910029

(51) Int. Cl.
*B64D 33/02* (2006.01)
*F02C 7/045* (2006.01)

(52) U.S. Cl.
CPC .............. *B64D 33/02* (2013.01); *F02C 7/045* (2013.01); *B64D 2033/0206* (2013.01); *F05D 2220/323* (2013.01); *F05D 2260/96* (2013.01)

(58) Field of Classification Search
CPC ............ B64D 15/04; B64D 2033/0233; B64D 2033/0206; B64D 2033/0286;
(Continued)

(56) References Cited

U.S. PATENT DOCUMENTS

2002/0157764 A1* 10/2002 Andre ................... G10K 11/172
156/252
2006/0219475 A1* 10/2006 Olsen ...................... F02C 7/045
181/210
(Continued)

FOREIGN PATENT DOCUMENTS

| EP | 2216773 A1 | 8/2010 |
| EP | 2537753 A1 | 12/2012 |
| WO | 2012145141 A1 | 10/2012 |

OTHER PUBLICATIONS

French Search Report; priority document.

*Primary Examiner* — Devon C Kramer
*Assistant Examiner* — Kelsey L Stanek
(74) *Attorney, Agent, or Firm* — Greer, Burns & Crain, Ltd.

(57) ABSTRACT

An acoustic panel for an aircraft nacelle air intake comprising a resistive skin perforated by noise absorption holes and a core against which the resistive skin extends, wherein the resistive skin has a smooth visible face and a castellated rear face with alternating ribs and grooves. The noise absorption holes are formed exclusively in the grooves, i.e., in a zone where the skin is less thick, which enables the holes to have a diameter that is both greater than the thickness of the skin and small enough not to have any impact on drag. The mechanical strength of the resistive skin provided by the ribs ensures that the lesser thickness of the resistive skin in the grooves does not render the resistive skin overly flexible.

14 Claims, 6 Drawing Sheets

(58) Field of Classification Search
CPC .......... B64D 33/02; F02C 7/045; F02C 7/047;
F01D 25/24; G10K 11/168; G10K
11/172; F04D 29/665; F04D 29/441
USPC ........................................................ 415/119
See application file for complete search history.

(56) References Cited

U.S. PATENT DOCUMENTS

| | | |
|---|---|---|
| 2012/0317782 A1 | 12/2012 | Porte et al. |
| 2014/0034416 A1 | 2/2014 | Liu |
| 2015/0071760 A1 | 3/2015 | Liu et al. |
| 2020/0070949 A1* | 3/2020 | Porte .................. B32B 3/12 |
| 2020/0276641 A1* | 9/2020 | Benard ................ B64D 15/04 |
| 2021/0078718 A1* | 3/2021 | Bourhis ............... B64D 33/02 |

\* cited by examiner

ACOUSTIC PANEL FOR AN AIRCRAFT NACELLE AIR INLET WITH CASTELLATED RESISTIVE SKIN, PROPULSION UNIT AND AIRCRAFT FITTED WITH SUCH ACOUSTIC PANELS

CROSS-REFERENCES TO RELATED APPLICATIONS

This application claims the benefit of the French patent application No. 1910029 filed on Sep. 12, 2019, the entire disclosures of which are incorporated herein by way of reference.

FIELD OF THE INVENTION

The invention relates to an acoustic panel for an aircraft nacelle air intake, as well as a propulsion unit and an aircraft fitted with such an acoustic panel.

BACKGROUND OF THE INVENTION

Conventionally, a nacelle comprises, from front to back, a first section upstream of the aerodynamic flow, referred to as the air intake, a second section that covers the casing of the engine fan, referred to as the fan cover, and a third section that usually has a thrust inversion zone surrounding the turbine body of the engine downstream of the aerodynamic flow.

An air intake, as illustrated in FIG. 1 attached, usually includes structural elements such as a front frame 101 and a rear frame 104, as well as, from the front to the rear of the nacelle, a lip 100 carried on the front frame 101, outer panels 102 extending the lip outside of the nacelle, internal acoustic panels 103 extending the lip inside the nacelle and forming an internal conduit used to channel air towards the engine, the outer panels 102 and inner panels 103 being carried by the front frame 101 and the rear frame 104.

The shape of the air intake and/or the systems (for example, the de-icing pipe 105) fitted thereto must prevent the formation and/or accumulation of ice or frost, limit the impact of unwanted noise, perform an aerodynamic function, and prevent birds from entering the fan compartment containing the engine systems. The unwanted noise is usually attenuated by providing the aforementioned acoustic panels 103.

Throughout the description, an acoustic panel (either from the prior art or according to the invention) is deemed to be installed in an air intake of the aircraft. The expressions "transverse direction" and "transversely" thus refer to a direction that extends in a transverse plane of the air intake, i.e., a direction orthogonal to the central axis of the air intake. The expression "longitudinally" refers to a direction parallel to the central axis X of the air intake, if the air intake can be considered to be cylindrical, or to a generator of the air intake if the air intake can be considered to be conical. A "longitudinal plane" is a plane that contains the central axis of the air intake.

Known acoustic panels for air intakes usually comprise:
a resistive skin that forms the visible face of the internal conduit of the air intake (downstream of the lip) and that is designed to absorb sound waves,
a rear skin essentially designed to ensure the structural strength of the panel,
a honeycomb core on either side of which are fastened the resistive skin and the rear skin, the core contributing both to the mechanical strength of the panel and to acoustic damping, with the damped sound frequency being determined by the thickness of the core.

Mechanically, it should be noted that the acoustic panel must be able to withstand a given aerodynamic load (overpressure), potential impacts with external objects such as birds, and significant thermal variations.

The resistive skin of known acoustic panels is perforated by a multitude of holes to absorb the sound waves. To ensure that the holes do not get blocked during use, their diameter must be equal to or greater than the thickness of the perforated layer. In practice, known resistive skins are made up of two or three plies and have a total thickness of between 0.8 mm and 1.6 mm, resulting in hole diameters of between 0.8 mm and 1.6 mm.

The impact of the holes on drag increases in proportion to the diameter thereof. Reducing the thickness of the resistive skins in the prior art to reduce the diameter of the holes is only feasible up to 0.6 mm, since the resistive skin obtained otherwise would not be mechanically strong enough.

SUMMARY OF THE INVENTION

The invention is intended to limit the drag generated by the acoustic panels of air intakes while proposing an acoustic panel of simple design that is simple to manufacture and in which the resistive skin provides satisfactory mechanical strength.

To do so, the invention proposes an acoustic panel for an aircraft nacelle air intake comprising a resistive skin perforated by noise absorption holes and a core against which the resistive skin extends, characterized in that the resistive skin has a smooth visible face and a castellated rear face with alternating grooves, corresponding to a first layer (referred to as the acoustic layer) of the resistive skin, and ribs formed by a second layer (referred to as the structural layer), the noise absorption holes being formed only in the grooves, i.e., in the zones where the resistive skin is thinnest.

According to the invention, it is possible for the resistive skin to have a thickness of less than 0.6 mm in the grooves (first acoustic layer), the thicker ribs ensuring the mechanical strength of the resistive skin.

Thus, again according to the invention, the noise absorption holes advantageously have a diameter, or more generally at least one frontal dimension (if the holes are not circular) that is equal to or greater than the thickness of the resistive skin in the grooves.

The fact that the holes have a dimension that is smaller than the holes in the acoustic panels in the prior art reduces the drag caused, without increasing the risk of the holes becoming blocked. The first acoustic layer can therefore be considered to be linear with micro-perforations.

According to one possible feature of the invention, the ribs and the grooves of the resistive skin extend in longitudinal planes. These are thus referred to as longitudinal ribs and longitudinal grooves.

In this case, preferably, the acoustic panel also includes strengthening coils in the form of a helical strip or of a plurality of transverse strips extending between the resistive skin and the core of the acoustic panel and encircling the ribs. In this case, "transverse strips" means strips extending in the circumferential direction in transverse planes.

Gluing strengthening coils to the ribs has no effect on the sound absorption properties of the resistive skin, since the shape of the ribs moves the strengthening coils away from the holes formed in the grooves. The open surface ratio (TSO) of the acoustic panel remains the same whether the resistive skin is structurally reinforced by coils or not. The open surface ratio (TSO) is therefore precisely controlled.

In a variant, the ribs of the resistive skin extend essentially in transverse planes, i.e., in planes that are orthogonal to the central axis X of the air intake. These are thus referred to as transverse ribs.

Similarly, grooves extending essentially in transverse planes are referred to as transverse grooves.

In this case, the addition of strengthening coils as described above is unnecessary since the forces are absorbed by the ribs themselves. The thickness of the ribs (or of some of the ribs) can be increased if necessary, to improve the rigidity and solidity of the resistive skin. Increasing the thickness of the ribs has no effect on the acoustic qualities of the panel since the noise absorption holes are formed in the grooves.

In both of the embodiments described above (with longitudinal ribs or transverse ribs), the second structural layer of the resistive skin takes the form of strips separated from one another. According to a third option, the second structural layer of the resistive skin is a perforated continuous layer in which are formed openings that can be rectangular or oblong or circular or of any shape, the noise absorption holes formed in the first acoustic layer being arranged facing these openings; a network of ribs of various directions (or even also of variable widths), for example a grid of transverse and longitudinal ribs (if the openings are rectangular), is then obtained.

According to a possible feature of the invention, the resistive skin also has a front flange and/or a rear flange extending the visible face of the skin in transverse planes towards the outside of the air intake (i.e., in a centrifugal direction) to close the acoustic panel at its front and/or rear end.

The front or rear flange preferably has the same thickness as the ribs in order to effectively contribute to the rigidity of the panel. The flange can be thicker if necessary.

According to a possible feature of the invention, the resistive skin is a one-piece part, i.e., integrally formed. This part can be obtained in a single molding step or, preferably, formed by successive plies. It should be noted that the first acoustic layer can be formed by one or more plies. The same applies to the second structural layer.

The second structural layer can be arranged and fastened on the first acoustic layer using any suitable method (gluing, welding, consolidation, firing, etc.), in particular by 3D printing.

According to a possible feature of the invention, the resistive skin and the aforementioned strengthening coils, are made of a thermoplastic or thermosetting composite material, preferably a thermoplastic carbon, i.e., a material based on carbon fibers and a thermoplastic resin, for example a high-performance thermoplastic resin such as polyether ether ketone (PEEK), polyphenylsulfone (PPSF), polyetherimide (PEI), polyetherketoneketone (PEKK), etc.

The invention also relates to an air intake characterized in that it includes acoustic panels according to the invention. More specifically, an air intake according to the invention has an inner wall (downstream of the lip, between the front frame and the rear frame) formed by acoustic panels according to the invention.

Usually, each panel corresponds to a sector of inner wall that extends longitudinally between the front frame and the rear frame of the air intake and that has rectilinear longitudinal sides, two successive panels having adjacent longitudinal sides.

Different solutions can be used to fastened two successive panels along the adjacent longitudinal sides thereof. In general and in the different solutions proposed below, two successive panels are assembled via the resistive skin of the panels and each panel has a thin edge tongue on at least one of the longitudinal sides thereof for this purpose. In most of the proposed solutions, the thin edge tongue is advantageously the first layer of the resistive skin (thickness in the grooves). Consequently, there is no second layer (ribs) in these edge tongues, which have a "smooth" rear face (i.e., having no steps or shoulders or deformations).

According to a first possible solution, the resistive skins of two adjacent panels are fastened together by swaging and gluing or welding. In this case, for example, each panel includes a swaged thin edge tongue on one side of the panel and an unswagged thin edge tongue on the other side of the panel. The thin edge tongue can be the first acoustic layer of the resistive skin.

According to a second solution, each panel has, on each of the longitudinal sides thereof, a thin edge tongue that is advantageously the first acoustic layer of the skin and has a "smooth" rear face (no shoulders or other deformations). The adjacent edge tongues of two successive panels are assembled using added fishplates fastened to the rear face of the edge tongues (i.e., between the resistive skin and the core of the panels). The added fishplates can be fastened to the rear face of the edge tongues by gluing or welding for example. The added fishplates can take the form of a rectangular plate. Alternatively, when the ribs of the resistive skin of the panels are transverse ribs, the added fishplate can have the shape of one or more H-shapes, the arms of the H-shapes extending the transverse ribs while the central bar of the H-shapes covers the join between the edge tongues of the panels.

According to a third solution, each panel has a first thin edge tongue formed by the first acoustic layer of the resistive skin on one side, and a second thin edge tongue formed by the second structural layer of the resistive skin on the other side. Successive panels are assembled by lapping and gluing or welding (or any other suitable fastening method) the first tongue (first layer) of a panel and the second tongue (second layer) of the following panel. Thus for example, if the second layer is formed of transverse strips only, each panel has a first side with "recessed ribs" in which the transverse ribs "stop" before the edge of the first layer, and a side with projecting ribs in which the ribs project from the first layer. The projecting portion of the transverse ribs then act as fishplates.

According to a fourth solution, each panel has, on one side, a first edge tongue with an internal step or steps, the tongue having overlapping plies forming at least one step on the rear face of the edge tongue, and, on the other side, a second edge tongue with an external step or steps, the tongue having overlapping plies forming at least one step on the visible face (front face) of the tongue. Two successive panels are assembled by lapping and gluing or welding (or any other suitable fastening method) the edge tongue with an internal step or steps of one panel and the edge tongue with an external step or steps of the other panel, the steps of the tongues fitting together to form a one-ply fishplate (if the tongues have only one step) or a two-ply fishplate (for tongues with two steps, resulting from three plies).

According to a fifth solution, each panel has a first edge tongue with a front bevel on one side and a second edge tongue with a back bevel on the other side. The edge tongue with a back bevel of a panel can then be fastened to the edge tongue with a front bevel of the adjacent panel by lapping and gluing or welding (or other) the bevels. This creates a scarf joint in which the forces are transmitted over an incline. Preferably, the (front and back) bevels extend over a width of between 10 mm and 30 mm. In general, the different edge tongues described above preferably have a width of between 10 mm and 30 mm.

An air intake according to the invention can be segmented into 3 to 10 angular sectors and therefore have between 3 and 10 acoustic panels. The number of panels is determined as a function of the diameter of the air intake such that the arranged panels can be handled safely by operatives.

BRIEF DESCRIPTION OF THE DRAWINGS

Other details and advantages of the present invention are set out in the description below, which is provided with reference to the attached schematic drawings and covers preferred embodiments provided by way of non-limiting example. In these drawings.

Figure 1:
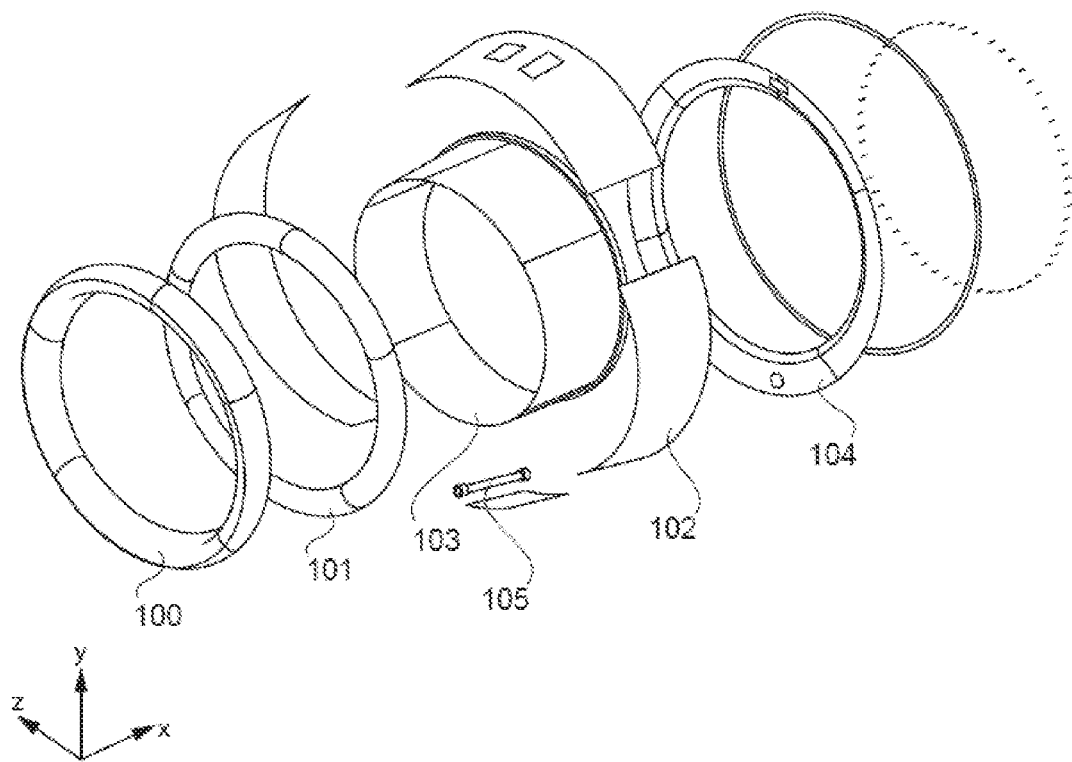
FIG. 1 is an exploded perspective view of an air intake according to the prior art. This air intake is described in the introduction.
Figure 2:
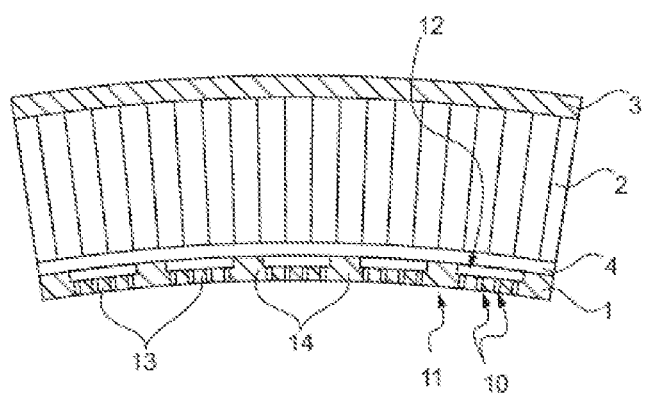
FIG. 2 is a schematic cross-section view taken along a transverse plane of a portion of an acoustic panel corresponding to a first embodiment of the invention.

It should be noted that, for the sake of clarity, the ratio between the different dimensions of the elements shown is not accurately reproduced in any of the figures. In particular, the curvature of the panel portion in FIG. 2 is very exaggerated (the ratio between this curve and the thickness of the panel has not been accurately reproduced). Similarly, the proportions between the length, width and thickness of the panels or of the ribs, grooves and any strengthening coils shown in FIGS. 3 and 4 have not been accurately reproduced.

DETAILED DESCRIPTION OF THE PREFERRED EMBODIMENTS

Figure 4:
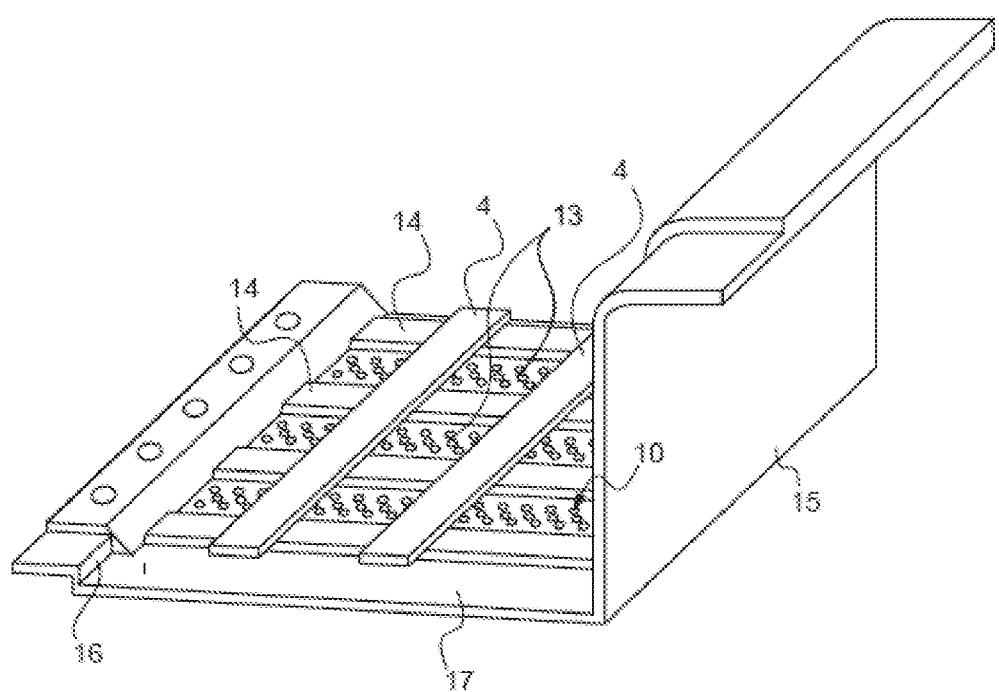
FIG. 4 is a schematic perspective view of the resistive skin of the first embodiment in FIG. 2.

An acoustic panel according to the invention, such as the one shown in FIGS. 2 and 4, includes a resistive skin 1, a core 2 having a cell structure that can be a honeycomb structure, and optionally a rear skin 3. The resistive skin 1 has a castellated rear face 12 with alternating grooves 13 and ribs 14, and a "smooth" front face 11, i.e., with no steps or shoulders or grooves or other deformations/recesses or roughness (with the exception of the noise absorption holes). The face 12 of the skin is applied against the core, and therefore covers it entirely, the ribs thus forming recesses at the grooves between the skin and the smooth surface of the core.

In other words, the resistive skin according to the invention has a first layer performing an acoustic function, corresponding to the thickness of the grooves and in which the noise absorption holes are formed, and a second layer performing a structural function on top of the first layer to form the ribs, this second layer therefore not covering the entire surface of the first layer.

The thickness of the resistive skin 1 in the grooves 13 (i.e., the thickness of the first acoustic layer) is preferably at least 30% less than the thickness of the resistive skin in the ribs 14 (thickness of the overlapping of the first acoustic layer and the second structural layer).

The thickness of the resistive skin in the grooves 13 is preferably at most equal to 150% of the smallest dimension of the noise absorption holes (described below) in the case of circular or square noise absorption holes, or at most equal to 200% in the case of oblong holes.

The resistive skin 1 is perforated (for example by punching) by noise absorption holes 10 to enable sound waves to penetrate the resistive skin 1. According to the invention, these noise absorption holes are only formed in the grooves 13.

The noise absorption holes 10 shown in the figures are circular, but the invention is not limited to this shape of hole.

In the case of circular noise absorption holes, the diameter of the holes is preferably less than 0.6 mm depending on the ratio between the open surface (the holes) and the closed surface, this ratio being referred to as the open surface ratio (TSO) in the remainder of the description. In other words, the open surface ratio (TSO) is the percentage of open surface (the holes) in relation to the skin surface in question. For an open surface ratio (TSO) of between 0% and 2%, the holes have a diameter of less than 0.6 mm. For an open surface ratio (TSO) greater than 2%, the holes have a diameter of less than 0.3 mm. For an open surface ratio (TSO) greater than 2%, the diameter of the noise absorption holes is, for example, 0.1 mm for a resistive skin with a thickness of 0.15 mm in the grooves. According to another example, the diameter of the noise absorption holes is 0.2 mm for a resistive skin with a thickness of 0.3 mm in the grooves. The noise absorption holes 10 are then considered to be micro-perforations that cause little drag.

It should be noted that the noise absorption holes 10 can have different diameters or the same diameter, the second option simplifying manufacture.

As specified above, holes of different shapes, for example oblong holes, can be used. The oblong holes can have a length-to-width ratio of between 5 and 15. By way of illustration, holes 0.3 mm wide and between 1.5 mm and 30 mm long could, for example, be provided. The holes can also be teardrop shaped or be of any other shape.

In the case of non-circular holes, at least one of the frontal dimensions of the holes is advantageously greater than or substantially equal to the thickness of the resistive skin in the grooves.

The noise absorption holes, whether they be circular, oblong or shaped otherwise, are found at the bottom of the grooves, the thickness of which is significantly less than the thickness of the adjacent zones. This creates very thin open zones that are beneficial in terms of acoustics, and thick unbroken zones that are beneficial in terms of structural strength.

According to one embodiment, the thickness at the hole, which can be circular, slot shaped or shaped otherwise, can be reduced.

The width of the grooves 13 and the width of the ribs 14 are determined as a function of the desired open surface ratio (TSO). In the example illustrated, all of the grooves 13 are of the same width (which is not mandatory), for example on the order of 4 mm. Similarly, all of the ribs are of the same width (which is not mandatory), which can be on the order of 2 mm.

The resistive skin 1 can be built by assembling a first unbroken ply made of thermoplastic carbon, this first ply being the first acoustic layer, i.e., having the thickness of the skin in the grooves 13, and a second ply made of thermoplastic carbon that is the second structural layer that forms the ribs 14, the second ply having large openings in the form of longitudinal strips corresponding to the space between two ribs 14. The first ply (or first layer) can be perforated or micro-perforated (before assembly) or be unperforated, in which case the noise absorption holes 10 are formed after the plies are assembled.

In a variant, each (structural, acoustic) layer can be formed by several plies.

In a variant, the resistive skin 1 can be formed from a single ply and obtained by molding. The absorption holes can be made after demolding or during molding.

The shape of the section of the ribs and grooves is identical over at least a portion of the length thereof or over the entire length thereof.

In the first embodiment of an acoustic panel according to the invention, as shown in FIGS. 2 and 4 (the core and the rear skin of the panel are not shown in FIG. 4), the ribs 14 and the grooves 13 are rectilinear and extend in longitudinal planes when the panel is viewed in position in an air intake. As usually defined, the ribs and grooves are at least partially parallelepipedic, i.e., for example of rectangular or trapezoidal or lozenge section, and can be entirely substantially parallelepipedic. The recesses formed in the grooves are therefore at least partially parallelepipedic and can be entirely substantially parallelepipedic. In this first embodiment, the acoustic panel also includes strengthening coils 4 between the resistive skin 1 and the core 2 of the panel. The strip 4 is interposed between the castellated skin and the core and thus moves the surface of the core away from the surface of the castellated skin described above identically, i.e., by the height of the strip 4 both in the ribs and in the grooves. The strip 4 forms a space of constant height that prevents any contact between the castellated skin and the core.

These strengthening coils 4 are circumferential strips, each extending in a transverse plane (a plane orthogonal to the central axis of the air intake) over the ribs 14. The coils 4 are designed to increase the mechanical strength of the resistive skin 1. The thickness and width of the strengthening coils are determined as a function of the desired mechanical characteristics of the resistive skin 1.

The circumferential strips 4 extending in transverse planes can be replaced by a helical coil, i.e., by a single strip that winds about the resistive skin to form a helix, in which case the reinforcing strip does not extend in transverse planes.

The resistive skin 1 of the first embodiment also has a rear flange 15 and a front flange 16. The rear flange 15 closes the rear end of the panel over the entire thickness thereof, while the flange 16 only covers a portion of this thickness. In a variant, the panel can have a front flange extending transversely as far as the rear skin of the panel, similarly to the rear flange 15, or inversely a partial rear flange similar to the front flange 16 shown.

In the panels known from the prior art, the materials and manufacturing methods used confer a degree of rigidity on the resistive skin that is impossible to obtain from the rear and front flanges (which have opposing curvatures) extending in transverse planes, at 90° to the perforated portion of the resistive skin. The flanges are then formed with an "incline" of several degrees, which results in the flange having a significant longitudinal dimension that reduces the space available for the perforations and limits the open surface ratio (TSO) and the acoustic performance of the panel. In a resistive skin according to the invention, the materials and manufacturing methods that can be implemented do not impose any constraints on the shape of the flanges, so that the entire length of the panel or nearly the entire length of the panel can be used for sound absorption, thereby improving the acoustic performance of the panel.

Figure 3:
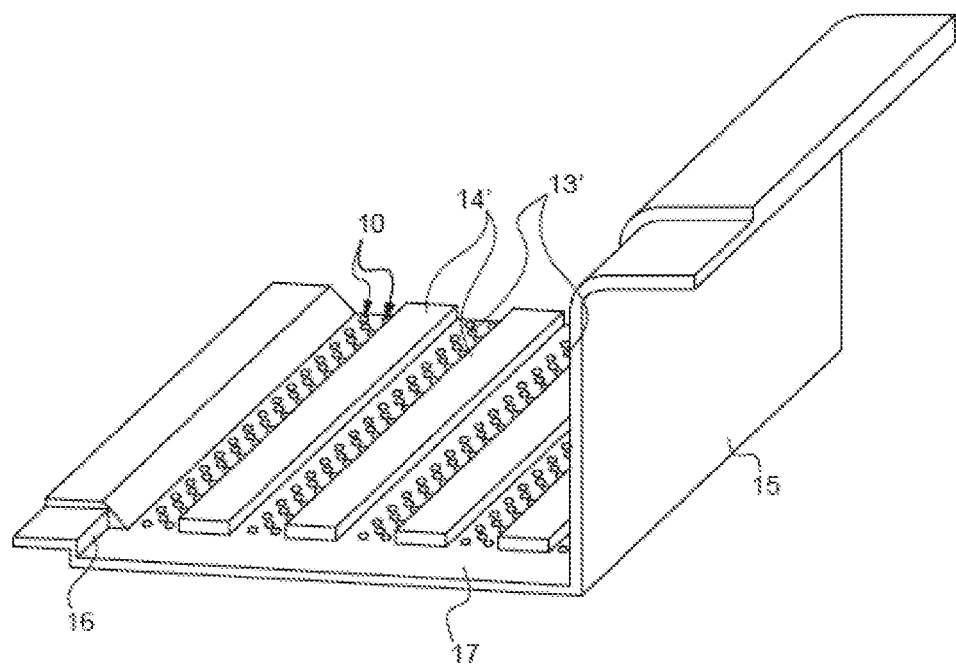
FIG. 3 is a schematic perspective view of the resistive skin according to a second embodiment of an acoustic panel according to the invention.

FIG. 3 shows the resistive skin according to a second embodiment of an acoustic panel according to the invention. The resistive skin of this panel has alternating grooves 13' and ribs 14' extending in transverse planes. Similarly to the first embodiment, micro-perforations are provided in the thickness of the grooves 13'. Furthermore, the panel has a front flange 16 and a rear flange 15 that are similar to the flanges in the first embodiment.

Conversely, the panel does not have strengthening coils since the main forces are absorbed directly by the ribs 14', the thickness of which can be designed to withstand these forces.

Each panel has opposing longitudinal edges (each edge extending in a longitudinal plane containing the central axis of the air intake when the panel is installed in an air intake) that are rectilinear and have a thin longitudinal edge tongue 17. The edge tongue 17 is wide enough to enable the panel to be correctly fastened to the adjacent panel, for example by swaging and gluing or welding. The edge tongue 17 has no absorption holes since it is designed to be covered by the edge tongue of the adjacent panel.

The thickness of this edge tongue 17 corresponds, for example, to the thickness of the skin in the grooves (thickness of the first acoustic layer made of thermoplastic carbon). In the case of assembly by swaging of the edge tongues 17 of two adjacent panels, the thickness of resistive skin at the join between the two panels (where the edge tongues 17 of the two panels overlap) is therefore equal to twice the thickness in the grooves, i.e., the thickness of the ribs when the ribs are formed by a second layer of the same thickness as the first layer.

Figure 5:
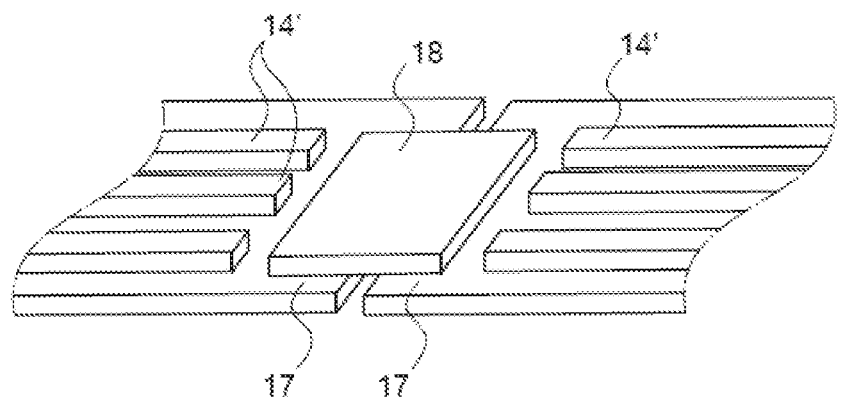
FIG. 5 is a schematic perspective view of a first embodiment of the join between two successive panels with a resistive skin having transverse ribs.

FIG. 5 shows an assembly solution for two successive panels by fish-plating. Again, each panel has, on each of the longitudinal sides thereof, a thin edge tongue 17 that is limited to the first skin layer and therefore has no ribs 14'. A rectangular fishplate 18 is arranged across the smooth rear faces of the adjacent edge tongues 17 of two successive panels. This fishplate 18 can be fastened to the two tongues by any suitable means (gluing, welding, etc.).

Figure 6:
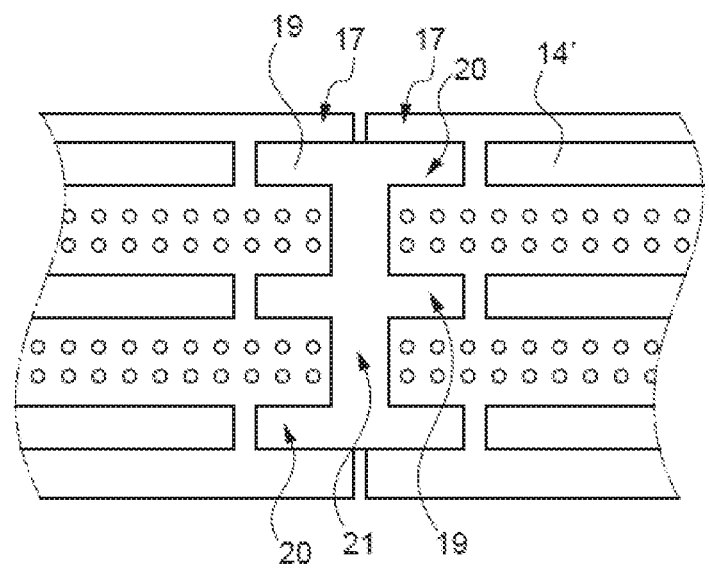
FIG. 6 is a schematic top view (in a centripetal direction) of a second embodiment of the join between two successive panels with a resistive skin having transverse ribs.

FIG. 6 shows another fishplate 19 that can be used to assemble the resistive skin of the two panels in FIG. 5. This fishplate 19 has a double-H shape. The arms 20 of the H-shapes transversely extend the transverse ribs 14' of the panels, while the central bar 21 of the H-shapes extends longitudinally at the join between the two panels.

Figure 7:
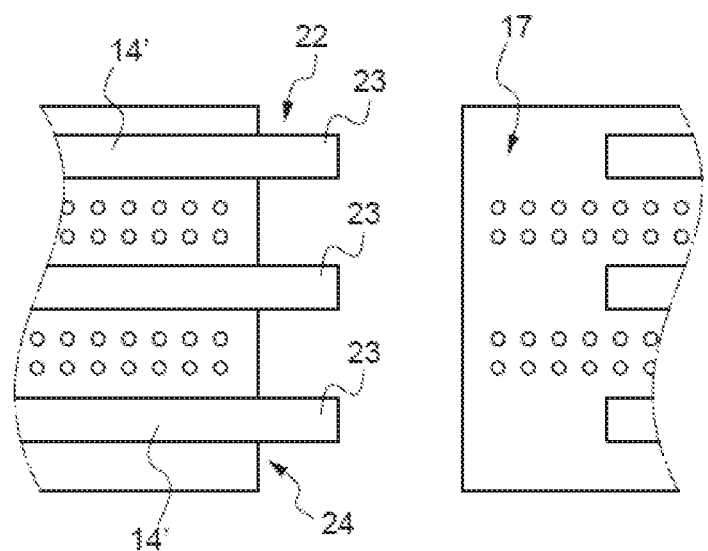
FIG. 7 is a schematic top view of a third embodiment of the join between two successive panels with a resistive skin having transverse ribs.
Figure 8:
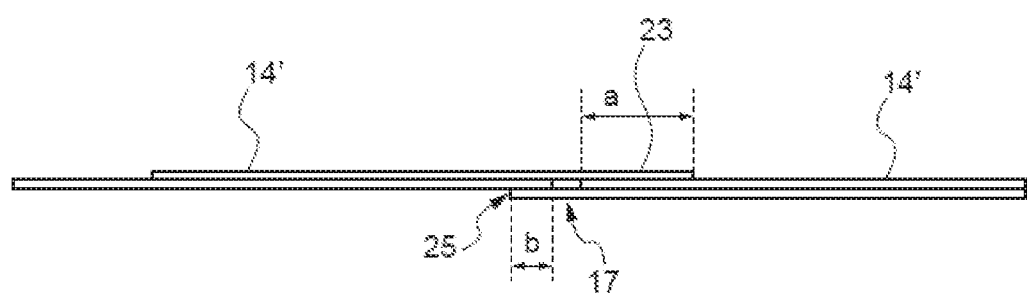
FIG. 8 is a transverse cross-section view of the join in FIG. 7.

FIG. 7 shows another assembly solution for two successive panels by fish-plating, in the case of panels having a resistive skin with transverse ribs 14'. In this solution, the ribs themselves act as fishplates. Each panel has a first thin edge tongue 17 on one side that is the first acoustic layer, as in the above examples. Conversely, on the other side, the panel has a second thin edge tongue 22 that is the second structural layer of the skin. In this example, the second layer comprises transverse strips 14' forming ribs. The second edge tongue 22 therefore comprises portions of transverse strips (ribs) that are separated from one another and that project from the edge 24 of the first acoustic layer over an overhang width that is, for example, on the order of 25 mm. The panels are arranged such that the ribs 14' of one of the panels extend the ribs 14' of the other panel (and vice versa) and preferably such that the projecting portion 23 of the ribs of the second edge tongue of the first panel overlap the ribs of the second panel over a width "a" (see FIG. 8) that is, for example, on the order of 20 mm. The first edge tongue 17 of the second panel is then arranged in part beneath the skin of the first panel over a width "b" on the order of 5 mm. In a variant, the first layers of the resistive skins of the two panels can be arranged edge-to-edge, although this is less efficient since it is not desirable for the air to be able to flow directly between the two panels at the join therebetween. Inversely, the step 25 created on the visible face of the panels at the join therebetween has little aerodynamic impact since this step is longitudinal and therefore in the flow direction.

Figure 9:
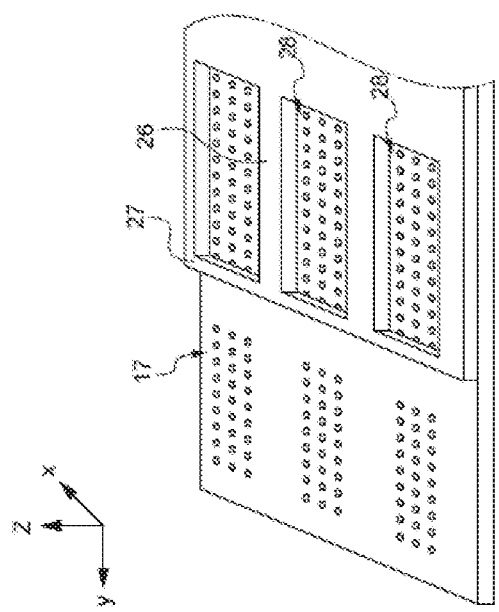
FIG. 9 is a schematic perspective view of a fourth embodiment of the join between two successive panels with a resistive skin having transverse and longitudinal ribs.
Figure 9:
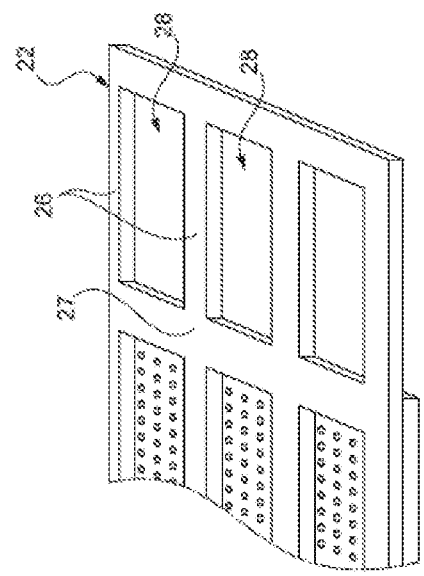

FIG. 9 shows another assembly solution for two successive panels by fish-plating. As in the previous example, each panel comprises a first edge tongue formed exclusively by the first layer of the skin and, on the opposite side, a second edge tongue formed exclusively by the second layer of the skin. In this example, however, the second structural layer differs from the second structural layer in the previous example in that it includes a continuous surface perforated by rectangular openings 28 to create transverse ribs 26 and longitudinal ribs 27 simultaneously.

The panels can be arranged edge-to-edge. In this case, the second edge tongue 22 entirely overlaps the first edge tongue 17. It can be seen that, unlike in the embodiments in FIGS. 3 and 4, the first edge tongue 17 has noise absorption holes since the second edge tongue 22 has openings 28 that enable passage of the sound waves absorbed through the holes in the first edge tongue 17.

The panels in FIG. 9 can also be arranged with an overlap as explained above, in which case the overlap is determined such that the row of openings 28 of the second edge tongue 22 of the first panel overlaps the first row of openings 28 of the second panel.

Figure 10:
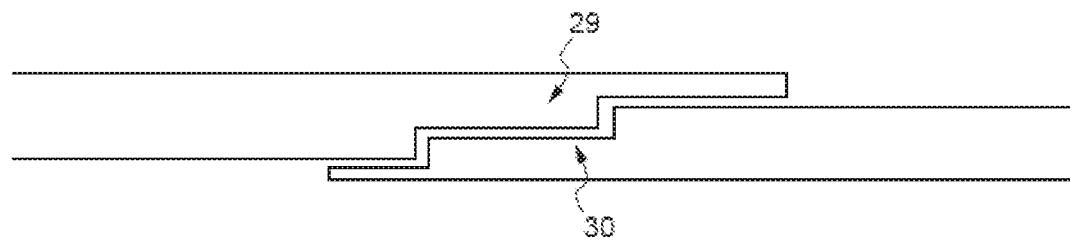
FIG. 10 is a schematic cross-section view of a fifth embodiment of the join between two successive panels.

FIG. 10 shows another assembly solution for two successive panels by fish-plating. In this example, the skin of each panel comprises an overlap of at least three plies (it should be noted that the sum of the three plies can constitute the thickness of the skin at the ribs or of the first acoustic layer only). Each panel has a first edge tongue 29 with two steps (or shoulders) on the front face thereof, and a second edge tongue 30 with two steps (or shoulders) on the rear face thereof. The steps correspond to the transition from one ply to another. Two successive panels are assembled by lapping (and fastening by gluing or welding for example) the first edge tongue 29 of one of the panels and the second edge tongue 30 of the other panel. This solution is good for panels in which the resistive skin has longitudinal or transverse ribs or both types of ribs (not shown in FIG. 10).

Figure 11:
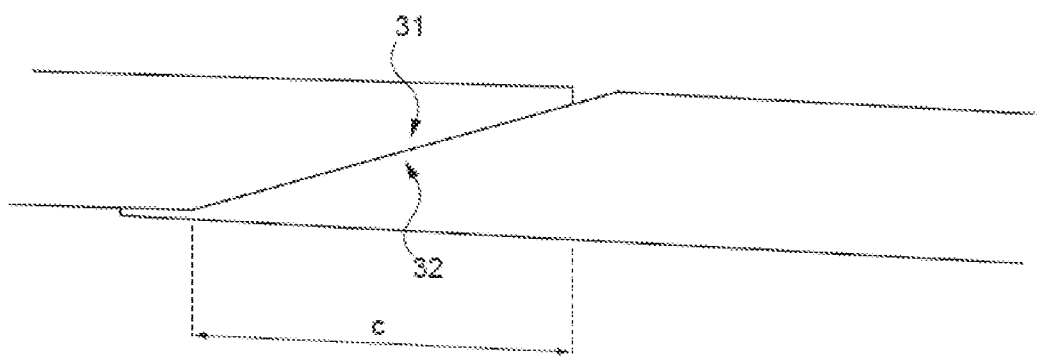
FIG. 11 is a schematic cross-section view of a sixth embodiment of the join between two successive panels.

FIG. 11 shows another assembly solution for two successive panels using a scarf joint. Each panel has a first edge tongue 31 with a beveled front face, and a second edge tongue 32 with a beveled rear face. The front and back bevels of the edge tongues are formed over a width "c" that can range from 10 mm to 30 mm, and over a thickness that corresponds to the first acoustic layer or to the total thickness of the skin (at the ribs). Two successive panels are assembled by lapping and fastening (by gluing or welding for example) the first edge tongue 31 with a front bevel of one of the panels and the second edge tongue 32 with a back bevel of the other panel. This solution is good for panels in which the resistive skin has longitudinal or transverse ribs or both types of ribs (not shown in FIG. 11).

The invention covers all variants available to the person skilled in the art, i.e., falling within the scope defined by the attached claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An acoustic panel for an aircraft nacelle air intake comprising:
    a resistive skin perforated by noise absorption holes, and
    a core against which the resistive skin extends and is fastened,
        the noise absorption holes enabling sound waves to propagate inside the core and to be attenuated therein,
        the resistive skin having a smooth visible face and a castellated rear face with alternating grooves corresponding to a thinner first acoustic layer of the resistive skin and ribs formed by a thicker second structural layer of the resistive skin, and
        the noise absorption holes being formed only in the grooves,
    wherein the ribs of the resistive skin extend in longitudinal planes,
    wherein the acoustic panel includes strengthening coils formed as a helical structural strip or a plurality of transverse structural strips extending between the resistive skin and the core of the acoustic panel and encircling the longitudinal ribs.

2. The acoustic panel for an air intake according to claim 1, wherein the resistive skin in the grooves is at least 30% thinner than the resistive skin in the ribs.

3. The acoustic panel for an air intake according to claim 1, wherein the second structural layer of the resistive skin is a perforated continuous layer with rectangular or oblong or circular openings that delimit the grooves in which the noise absorption holes are formed.

4. The acoustic panel for an air intake according to claim 1, wherein the noise absorption holes are circular and have a diameter of less than 0.6 mm for an open surface ratio of between 0% and 2% and less than 0.3 mm for an open surface ratio greater than 2%.

5. The acoustic panel for an air intake according to claim 1, wherein the resistive skin is a one-piece part.

6. The acoustic panel for an air intake according to claim 1, wherein the resistive skin is made of thermoplastic carbon.

7. An aircraft propulsion unit comprising a nacelle including an air intake fitted with acoustic panels according to claim 1, wherein the air intake panel has a thin edge tongue on each side that is the first acoustic layer of the resistive skin and having a smooth rear face, and wherein, at a join between successive acoustic panels, fishplates are fastened onto a rear face of adjacent edge tongues of the panels.

8. An aircraft comprising the aircraft propulsion unit according to claim 7.

9. An acoustic panel for an aircraft nacelle air intake comprising:
a resistive skin perforated by noise absorption holes, and
a core against which the resistive skin extends and is fastened,
the noise absorption holes enabling sound waves to propagate inside the core and to be attenuated therein,
the resistive skin having a smooth visible face and a castellated rear face with alternating grooves corresponding to a thinner first acoustic layer of the resistive skin and ribs formed by a thicker second structural layer of the resistive skin, and
the noise absorption holes being formed only in the grooves,
wherein the resistive skin has at least one of a front flange or a rear flange, each flange extending the visible face of the resistive skin in transverse planes towards an outside of the air intake.

10. An acoustic panel for an aircraft nacelle air intake comprising:
a resistive skin perforated by noise absorption holes, and
a core against which the resistive skin extends and is fastened,
the noise absorption holes enabling sound waves to propagate inside the core and to be attenuated therein,
the resistive skin having a smooth visible face and a castellated rear face with alternating grooves corresponding to a thinner first acoustic layer of the resistive skin and ribs formed by a thicker second structural layer of the resistive skin, and
the noise absorption holes being formed only in the grooves,
wherein the resistive skin has two rectilinear longitudinal sides, at least one of which has a thin edge tongue for fastening the acoustic panel to an adjacent acoustic panel.

11. The acoustic panel for an air intake according to claim 10, wherein the thin edge tongue is a first layer of the resistive skin.

12. The acoustic panel for an air intake according to claim 10, further including a swaged thin edge tongue on one side of the acoustic panel and an unswagged thin edge tongue on the other side of the acoustic panel.

13. The acoustic panel for an air intake according to claim 10, further comprising a first thin edge tongue formed by the first acoustic layer of the resistive skin on one side, and a second thin edge tongue formed by the second structural layer of the resistive skin on the other side.

14. The acoustic panel for an air intake according to claim 10, further having a first edge tongue with a front bevel on one side and a second edge tongue with a back bevel on the other side.

\* \* \* \* \*